Nov. 1, 1927.

L. V. LEWIS 1,647,834

RAILWAY TRAIN BRAKING APPARATUS

Original Filed Oct. 13, 1926

INVENTOR:
L. V. Lewis,
by A. R. Vincill,
His Attorney.

Patented Nov. 1, 1927.

1,647,834

UNITED STATES PATENT OFFICE.

LLOYD V. LEWIS, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAIN-BRAKING APPARATUS.

Application filed October 13, 1926, Serial No. 141,301. Renewed September 10, 1927.

My invention relates to railway train braking apparatus, and particularly to apparatus of the type comprising automatic mechanism co-operating with the usual engineer's brake valve for at times causing automatic application of the brakes.

I will describe one form of apparatus embodying my invention, and will then point out the novel features thereof in claims.

Figure 1:
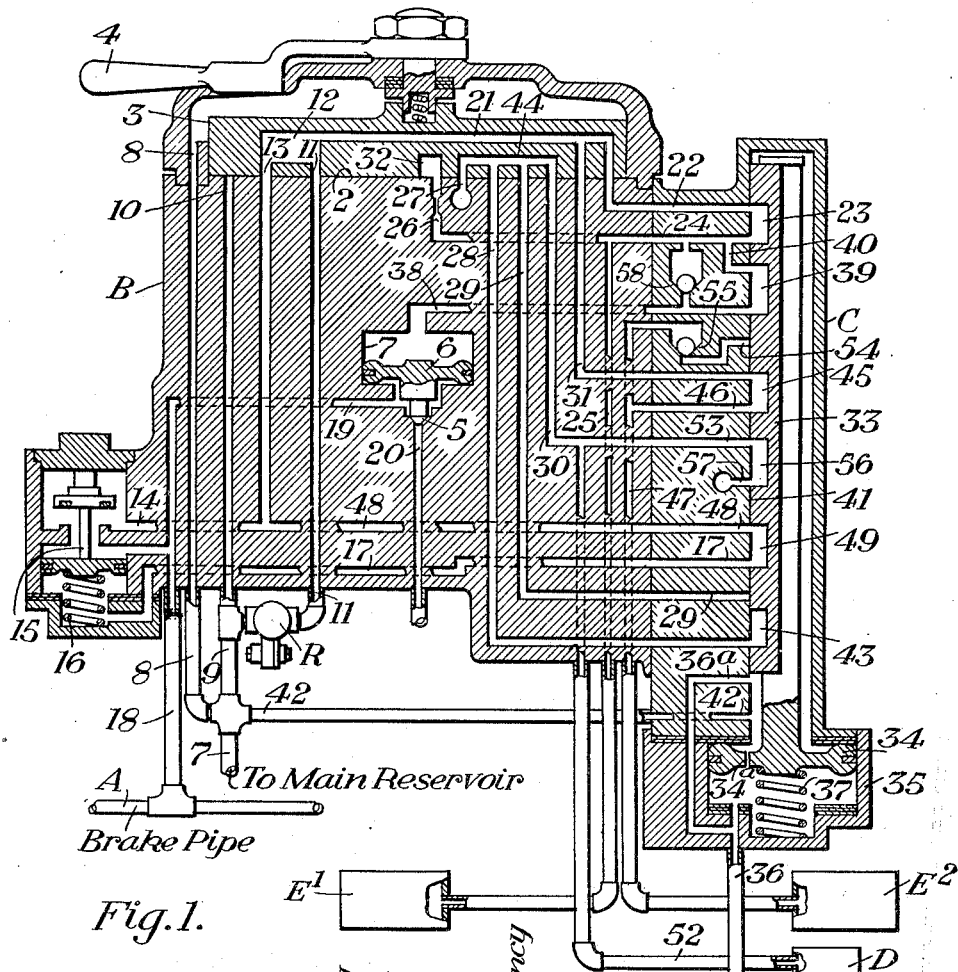
Figure 2:
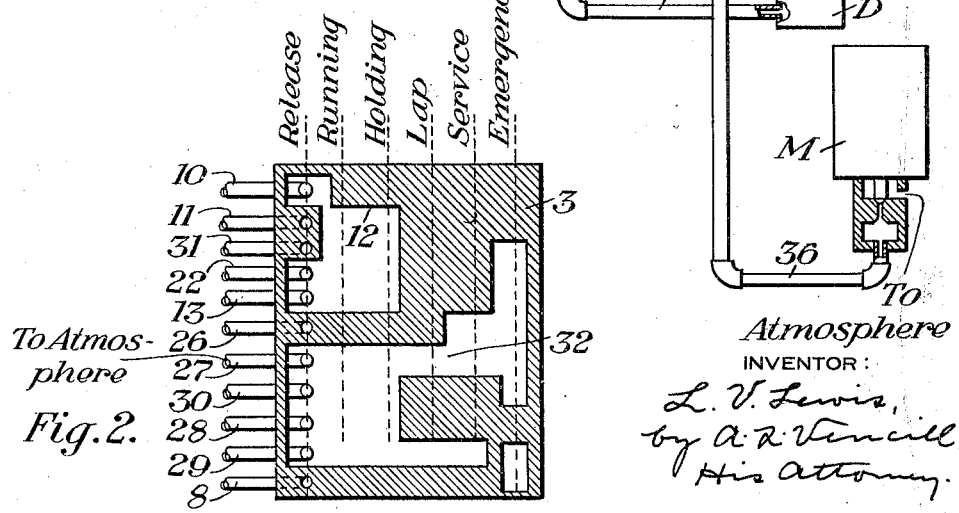

In the accompanying drawing, Fig. 1 is a vertical sectional view showing one form of apparatus embodying my invention. Fig. 2 is a developed plan view of the rotary valve 3 in the engineer's brake valve, showing the co-action of this rotary valve with its associated ports during the operation of the engineer's brake valve.

Similar reference characters refer to similar parts in each of the views.

Referring to the drawing, the reference character A designates the brake pipe of a standard braking system, and the reference character B designates the usual engineer's brake valve for the control of the pressure in the brake pipe A. The engineer's brake valve B comprises, as usual, a valve seat 2, a rotary valve member 3 co-operating with the ports in the valve seat 2, a handle 4 for the operation of the rotary valve member 3, and an equalizing discharge valve 5 controlled by an equalizing discharge valve piston 6 operating in cylinder 7. Associated with the engineer's brake valve is the usual feed valve R, the usual equalizing reservoir $E^1$, and a cut-off valve 15 which is provided in connection with automatic brake controlling apparatus to prevent charging the brake pipe while an automatic application of the brakes is taking place.

When the engineer's brake valve is in running position, air flows from the main reservoir through pipes 7 and 9, feed valve R, pipe 11, chamber 12, pipes 13 and 14, cut-off valve 15 and pipe 18 to the brake pipe A, thus charging the brake pipe with air at the reduced pressure delivered by feed valve R. Air at reduced pressure also flows from feed valve R, through pipe 11, chamber 12 and port 21, pipe 22, chamber 23 in an automatic brake application valve C, pipes 24 and 25 to the equalizing reservoir $E^1$. The brake pipe A is connected with the equalizing discharge valve 5 through pipes 18 and 19, and the chamber 7 above the piston 6 is connected with the equalizing reservoir $E^1$, and with feed valve R through pipe 38, cavity 39 and pipe 40. It follows that brake pipe pressure exists on both sides of the equalizing discharge valve piston 6 and in the equalizing reservoir $E^1$.

When the engineer's brake valve B is moved to the service position, all of the ports in valve seat 2 are blanked except that pipe 26 is connected through a restricted opening to port 27 which leads to atmosphere, so that the pressure in equalizing reservoir $E^1$ discharges to atmosphere, thereby causing the equalizing discharge valve 5 to exhaust brake pipe pressure to atmosphere through pipe 20.

The operation of the engineer's brake valve B when in running, holding, lap and emergency positions, are in accordance with usual and standard practice, so that detailed explanation is not required for the purposes of the present case.

The automatic brake application valve C comprises a slide valve 33 co-operating with a valve seat 41 formed on the side of the body of the engineer's brake valve B. The slide valve 33 is controlled by a piston 34 operating in a cylinder 35, the lower end of which is connected through pipe 36 with a magnet valve M. Magnet valve M is normally energized to blank the pipe 36, but when de-energized, it opens this pipe to atmosphere. This valve will ordinarily be controlled by traffic conditions in advance of the train in such manner that its magnet is energized when traffic conditions are safe and de-energized when traffic conditions are unsafe. Main reservoir air flows through pipes 7, and 42 to the chamber containing the slide valve 33, and through port $34^a$ in the piston 34 to the cylinder 35 on the underside of this piston, and to pipe 36. When pipe 36 is blanked at magnet valve M, the air pressures on the upper and lower sides of the piston 34 being equal, the slide valve 33 is held in its upper or normal position by the action of spring 37. When pipe 36 is opened to atmosphere by the de-energization of magnet valve M, the pressure on the underside of piston 34 is reduced, so that this piston and slide valve 33 are shifted downwardly to the reverse position. Pipe 26 then has a second connection with atmosphere through pipe 36ª, cavity 43 in slide valve 33, pipe 28, port 44 in the rotary member 3 and exhaust port 27 in valve body 2, provided the rotary member is in the "running" position, as shown. It follows that after magnet valve M again becomes energized, the brake application valve C cannot be restored to its normal position until the engineer moves his brake handle 4 to lap position, thereby disconnecting port 28 from port 27, and allowing the pressure to build up to normal on opposite sides of the piston 34.

Associated with the automatic brake application valve C is a second equalizing reservoir $E^2$ and a reduction limiting reservoir D.

When the automatic brake application valve C is in the normal position, the equalizing reservoir $E^2$ is supplied with air at brake pipe pressure from the feed valve R, through port 11, ports 12 and 21, port 31, cavity 45 and ports 46 and 47. The reduction limiting reservoir D is connected with atmosphere through pipe 52, port 53, cavity 56 and exhaust port 57, and also through ports 30, 44 and exhaust port 27. Air is also supplied to the lower side of the piston of the cut-off valve 15 from the feed valve R through ports 11, 12, 13 and 48, cavity 49 and port 17. The air pressures on opposite sides of the piston of the cut-off valve 15 being equal this valve is held in its open position by the action of the spring 16.

I will now assume that an automatic brake application occurs and that the engineman is incapacitated. Under this condition the engineer's brake valve handle 4 remains in the running position and the automatic brake application valve C is reversed. The lower chamber of the cut-off valve 15 is now connected with atmosphere through port 17, cavity 49, port 29, port 44 and port 27. The cut-off valve 15 therefore closes and so cuts off the supply of air to the brake pipe A from feed valve R through the rotary valve 3 of the engineer's brake valve. The reduction limiting reservoir D is connected to the equalizing reservoir $E^2$ through pipe 52, port 53, cavity 45 and ports 46 and 47. The connection from the reduction limiting reservoir D to atmosphere at port 57 is cut-off, but reservoir D remains connected to atmosphere through pipe 30 and port 27 as long as the rotary valve remains in running position. The pressure in the equalizing reservoir $E^2$ is therefore reduced to atmospheric pressure, and since the upper face of the equalizing discharge piston 6 is now connected with equalizing reservoir $E^2$ through port 38, recess 39, port 54, check valve 55 and port 47, this of course, will result in reduction in the pressure in the brake pipe A which will continue until atmospheric pressure is reached, thereby producing a maximum full service application of the brakes.

In case an automatic application occurs inadvertently due to the engineman's failure to properly control the train, he may avoid delay and limit the reduction due to the automatic application by moving his brake valve to the "lap" position as soon as the automatic application has started. This will result in closing the connection from the reduction limiting reservoir D to atmosphere through port 27, so that in this case the pressure in the equalizing reservoir $E^2$ will be reduced only to the amount at which the pressures in this reservoir and in reservoir D equalize, which, if the initial brake pipe pressure is 70 lbs. is usually 20 lbs. less, or 50 lbs. In this case a 20-lb. reduction will occur above piston 6, and this, will result in a reduction in the pressure in brake pipe A, limited to 20 lbs.

While the automatic brake application valve C is in the reverse position, the upper surface of the equalizing discharge piston 6 is connected with ports 24 and 26 through a check valve 58, so that the engineer is free to make a further reduction in brake pipe pressure by moving his brake valve handle 4 to either the service or the emergency position wherein port 26 is connected with port 27 and atmosphere through recess 32.

I will now assume that prior to the reversal of the automatic brake application valve C the engineer makes a partial service application, such, for example, as a 10-lb. reduction in the pressure in $E^1$ resulting in a 10-lb. reduction in brake pipe pressure, and that he restores his brake valve handle 4 to the lap position before the automatic brake valve C reverses. Upon reversal of the brake valve C the equalizing reservoir $E^2$, which was cut-off from the brake pipe by movement of the rotary valve, and is therefore still charged to the initial brake pipe pressure will be connected with the reduction limiting valve D as before, thereby causing a 20-lb. reduction in the pressure in this equalizing reservoir, whereupon the pressure above the equalizing discharge piston 6 will be reduced by a further 10 lbs., thereby completing a full service application of the brakes, but not reducing the brake pipe pressure below the 50-lb. value.

One feature of my invention is the provision of automatic brake applying means co-operating with the engineer's manual brake applying means in such manner that if an automatic application follows or is superimposed upon a partial or full manual service application, the result will be merely a full service application, that is, the brake pipe pressure will not be reduced below the value required to give a full service application and so there will be no waste of brake pipe air and no unnecessary delay in releasing the brakes due to such combined manual and automatic application.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In railway train braking apparatus of the type comprising an engineer's brake valve, an equalizing reservoir, and an equalizing discharge valve; the combination therewith of a second equalizing reservoir, a reduction limiting reservoir, an automatic brake application valve, means operating when said automatic valve is in normal position and said engineer's valve is in running position to connect said second equalizing reservoir with the brake pipe and said reduction limiting reservoir with atmosphere, means operating when said automatic valve is in normal position and the engineer's valve is in service or lap position to disconnect said second equalizing reservoir from the brake pipe, and means operating when said automatic valve is reversed and said engineer's valve is in service or lap position to disconnect said reduction limiting reservoir from atmosphere and to connect it to the second equalizing reservoir and also to said discharge valve through a check valve which permits air to flow from but not to the discharge valve.

2. In railway train braking apparatus of the type comprising the usual engineer's valve, equalizing reservoir, and equalizing discharge valve; the combination therewith of an automatic brake application valve, a second equalizing reservoir normally connected with the brake pipe, a reduction limiting reservoir normally connected with atmosphere, means operating when said automatic valve is reversed to connect said equalizing discharge valve with atmosphere if the engineer's valve remains in the running position, and to connect the equalizing discharge valve with said second equalizing reservoir and with said reduction limiting valve if the engineer's valve is in lap or a brake applying position, and means for disconnecting said second equalizing reservoir from the brake pipe when the engineer's valve is in brake applying or lap position and said automatic valve is in normal position so that if an automatic application follows a manual application the resulting reduction in brake pipe pressure will be no greater than if the manual application had not occurred.

3. In railway train braking apparatus of the type comprising the usual engineer's valve, equalizing reservoir, and equalizing discharge valve; the combination therewith of an automatic brake application valve, a second equalizing reservoir associated with said automatic valve and with said equalizing valve and normally connected with the brake pipe, and means for retaining initial brake pipe pressure in said second equalizing reservoir while a manual application is being made or held by the engineer's brake valve so that if an automatic application follows a manual application the resulting reduction in brake pipe pressure will be no greater than if the manual application had not occurred.

In testimony whereof I affix my signature.

LLOYD V. LEWIS.